United States Patent [19]

Onuma

[11] 4,207,757
[45] Jun. 17, 1980

[54] DOUBLE CARDAN UNIVERSAL JOINT

[75] Inventor: Kiyoshi Onuma, Toyota, Japan

[73] Assignee: Toyota Jidosha Kogyo Kabushiki Kaisha, Toyota, Japan

[21] Appl. No.: 928,618

[22] Filed: Jul. 27, 1978

[30] Foreign Application Priority Data

May 17, 1978 [JP] Japan ................................ 53-58692

[51] Int. Cl.² ........................... F16D 3/26; F16C 1/24
[52] U.S. Cl. ...................................... 64/17 R; 64/21;
308/72; 308/240; 64/8
[58] Field of Search ...................... 308/240, 72, 238;
64/17 R, 21, 27 NM, 8

[56] References Cited

U.S. PATENT DOCUMENTS

| | | | |
|---|---|---|---|
| 2,988,904 | 6/1961 | Mazziotti | 64/21 |
| 3,068,552 | 12/1962 | Williams et al. | 308/238 |
| 3,120,746 | 2/1964 | Kayser | 64/21 |
| 3,162,471 | 12/1964 | Mazziotti | 64/17 R |
| 3,301,008 | 1/1967 | Beinke | 64/21 |
| 3,380,843 | 4/1968 | Davis | 308/238 |
| 3,428,374 | 2/1969 | Orkin | 308/240 |
| 3,835,667 | 9/1974 | King | 64/17 R |
| 3,909,087 | 9/1975 | Cairns | 308/240 |
| 3,950,047 | 4/1976 | Capelli | 308/240 |
| 4,053,665 | 10/1977 | Orkin | 308/240 |
| 4,134,842 | 1/1979 | Orkin | 308/240 |

FOREIGN PATENT DOCUMENTS 1001752 8/1965 United Kingdom .................... 64/17 R Primary Examiner—Ira S. Lazarus
Assistant Examiner—Magdalen Moy
Attorney, Agent, or Firm—Cushman, Darby & Cushman

[57] ABSTRACT

In a double Cardan universal joint, a pair of cross joint assemblies each include a yoke and a trunnion of a cross, and a motion transmitting ring interconnects the two trunnions of a cross. There is provided a centering assembly including a socket member extending from one of the yokes and formed with a socket opening and a lubricant reservoir, a cylindrical stem extending from the other of the yokes into the socket opening, an annular insert mounted in the socket opening, a ball member oscillatorily retained in the annular insert and formed with an aperture for receiving the cylindrical stem for rotation about its own axis and axial sliding movement, a first seal means disposed between the outer peripheral surface of the ball member and the annular insert, and a second seal means disposed between the aperture in the ball member and the cylindrical stem. The annular insert includes a self-lubricating shoe member formed of a synthetic resinous material and a ring member formed of metal to be integral with the shoe member, and is formed with a gap or a plurality of notches.

7 Claims, 5 Drawing Figures

DOUBLE CARDAN UNIVERSAL JOINT

BACKGROUND OF THE INVENTION

This invention relates to a double Cardan universal joint and more particularly to an annular insert for use with double Cardan universal joints.

Conventional double Cardan universal joints provide constant driving torque transmission and are employed for driving construction vehicles or motor cars at low speeds. These universal joints can not operate satisfactorily at high speeds over 4000 rpm. The reason for this is that a centering assembly of the double Cardan universal joint for providing constant speed torque transmission is subject to seizure. In addition, these double Cardan universal joints are required to be applied with lubricant at short intervals even in the case of low speed operation.

Various types of shoe member have hitherto been proposed for receiving therein a ball member of the centering assembly. A shoe member formed of carbon steel by precision machining can be free of possible seizure at high speeds, but can not be subject to seizure when lubricant is exhausted to be free of oil film. These shoe members formed of carbon steel are generally formed with splits so as to render the manufacture thereof simple and facilitate fitting ball members thereinto. However, carbon steel material is hard and poorly resistant to seizure, burrs existing near the split or discrepancy in sliding surfaces tends to promote seizure at high speed operation.

In shoe members formed of sintered oilless alloy disclosed in U.S. Pat. Nos. 2,947,158 and 2,991,634, seizure can be prevented to a certain extent by oil contained in the alloy, even if lubricant leaks and exhausts from the shoe members. These shoe members each consist of a plurality of parts so as to accommodate rapping during sintering and to compensate for slight elastic deformability of the material during the assembly of a ball member. However, when a shoe member consists of a plurality of parts, a difficulty is encountered in fixing in place the shoe member in a narrow space within the centering assembly and high precision is degraded during assembling, thereby causing seizure or noise to develop.

SUMMARY OF THE INVENTION

A double Cardan universal joint according to the present invention exhibits an improved rotational performance at a high speed between 4000 and 6000 rpm.

The primary advantage of the present invention is that lubricant applied at first will satisfactorily last the double Cardan universal joint during its service life.

A preferred embodiment of the present invention comprises an annular insert including a ring member formed of sheet steel by press working, and a self-lubricating shoe member formed of a synthetic resinous material by injection molding in such a manner as to be integral with the ring member. A feature of present invention is that a heat resisting synthetic resinous material, for example, is used for forming the shoe member, which has hitherto been considered not to be compatible with synthetic resinous materials because of the conditions in temperature, load and sliding velocity which the double Cardan universal joint is subject to. Particularly, a ring member formed of sheet steel serves to prevent the shoe member made of resinous material from getting out of a socket opening, which shoe member disadvantageously tends to be dropped out due to repeated changes in temperature in repeated heating and cooling. Another feature of the present invention is that the annular insert is formed with a gap or notches to accommodate elastic deformation, thereby facilitating rapping during injection molding and fitting a ball member in the annular insert. Still another feature of the present invention is that the annular insert is of a construction which is low in cost and suitable for mass production.

DESCRIPTION OF THE PREFERRED EMBODIMENTS

Figure 1:
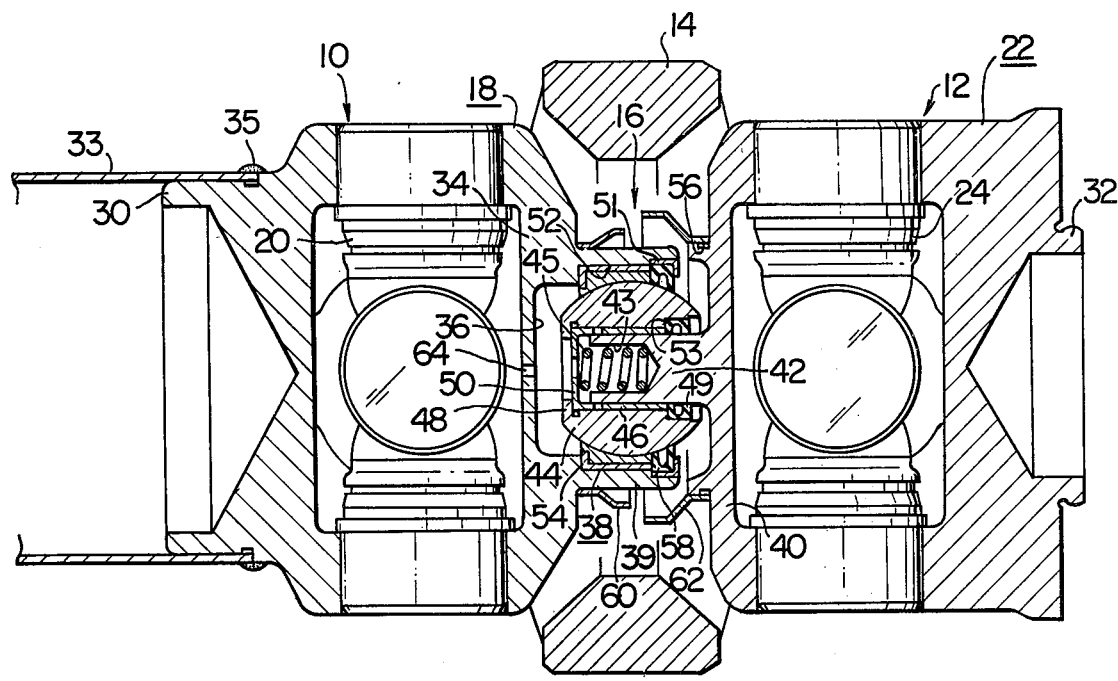
FIG. 1 is a longitudinal sectional view of a double Cardan universal joint according to the present invention.

Referring now to FIG. 1, a pair of cross joint assemblies 10 and 12 are operably connected by a transmission ring or intermediate motion transmitting member 14 and a centering assembly 16 for relatively positioning corresponding members of the cross joint assemblies 10 and 12 with respect to each other. The centering assembly 16 cooperates with corresponding members of the two cross joint assemblies 10 and 12 and causes these members to always assume the same angular position relative to an oscillation center of the centering assembly when a flexing of the two cross joint assemblies takes place.

The cross joint assembly 10 comprises a yoke 18 and a trunnion of a cross 20. The cross joint assembly 12 comprises similar yoke and trunnion of a cross 22 and 24. Each of these yokes 18 and 22 has spaced arms carrying suitable bearings which receive oppositely extending trunnions of the trunnions of a cross 20 and 24 respectively.

The intermediate motion transmitting member 14 includes two pairs of ears (not shown) extending in opposite directions axially of the structure and having suitable bearings for receiving trunnions (not shown) which extend at right angles to the trunnions of the trunnions of a cross 20 and 24 received by the arms of the yokes 18 and 22 respectively. Thus it is apparent that the intermediate motion transmitting member 14 is a double yoke member common to and connecting the cross joint assemblies 10 and 12. Moreover, from the foregoing it is understood that the trunnions of a cross 20 and 24 are trunnioned or swivelled in the yokes 18 and 22 and connect the same with the intermediate motion transmitting member 14.

The yoke 18 of the cross joint assembly 10 is provided with a skirt 30 to which a propeller shaft section 33 is rigidly joined by welding at 35. The yoke 22 of the cross joint assembly 12 may also be provided with a sleeve extension 32 for connection with a power shaft, such as an axle shaft of a motor vehicle.

As shown in FIG. 1, the centering assembly 16 is located between the two yokes 18 and 22. A bridge extension or web 34 integrally connects the arms of the yoke 18, and is formed with a socket portion 39. The socket portion 39 is formed with a socket opening 52, and an annular opening 51 of a larger diameter than that of the socket opening 52. The web 34 is also formed therein with a lubricant reservoir 36 which is of smaller diameter than the socket opening 52 and cooperates with the socket opening 52 to define an annular shoulder 54. The lubricant reservoir 36 is in communication with atmosphere through an air venting duct 64 formed in a wall portion of the web 34. An annular insert 38 according to this invention is force fitted into the socket opening 52 of the socket portion 39, and a first annular seal 58 is force fitted into the annular opening 51. The annular insert 38 thus is held against rotation about its own axis or axial movement.

A second bridge extension or web 40 integrally connects the arms of yoke 22, and is formed with a cylindrical stem 42 which extends outwardly from the web 40 axially of the sleeve extension 32. A counter bore 43 is formed in the cylindrical stem 42 for receiving a compression spring 45 therein. A spherical ball 44 having the ends thereof truncated is rotatable and axially slidable on the cylindrical stem 42. Interposed between the ball 44 and the cylindrical stem 42 is a bush 46 which facilitates the relative movement of the ball and stem. The ball is counterbored to accommodate the bush 46, and an annular shoulder 48 is formed in the wall of the aperture to hold a spring seat 50 against axial movement in one direction. A second annular seal 49 is disposed about the cylindrical stem 42 and maintained in engagement with a second annular shoulder 53 formed in the ball 44. Thus the bush 46 is limited in axial movement by the spring seat 50 and the second annular seal 49. The spring seat 50 urges the ball 44 toward the annular insert 38 by the biasing force of the compression spring 45 compressed between the bearing seat 50 and the bottom of the counter bore 43.

The first seal 58 may be in the form of conventional oil seal for sealing any leakage of lubricant and preventing foreign matter from entering between the ball 44 and the annular insert 38. The second seal 49 may also be in the form of conventional oil seal for sealing any leakage of lubricant, and also preventing foreign matter from entering between the cylindrical stem 42 and the ball 44. Secured as by caulking to the outer peripheral surface of the socket portion 39 is a first dust cover 60 for preventing foreign matter from entering the centering assembly 16. Also secured to the outer peripheral surface of an annular flange 56 of the yoke 22 is a second dust cover 62 for preventing dust or other foreign matter from entering the centering assembly 16.

Figure 2:
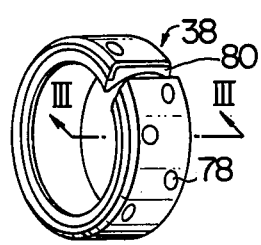
FIG. 2 is a perspective view of an annular insert according to an embodiment of the present invention.
Figure 3:
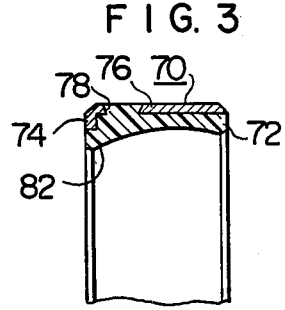
FIG. 3 is a sectional view taken along the line III—III in FIG. 2.

FIGS. 2 and 3 show one embodiment of the annular insert 38 according to the present invention. The annular insert 38 is substantially annular-shaped with a gap 80 being formed at a portion of its circumference, and comprises a self-lubricating shoe member 72 and a ring member 70. The ring member 70 is preferably made of sheet metal by press working and has a flange portion 74 and a cylindrical portion 76. The cylindrical portion 76 of the annular insert is formed with a plurality of countersinks 78 which are filled with the material of the self-lubricating shoe member 72 when the ring member 70 and the shoe member 72 are formed into a unitary structure. The self-lubricating shoe member 72 is formed with an inner, partially-spherical surface 82 for slidably receiving the ball 44.

The material for the self-lubricating shoe member 72 may be Oilless 75 (the trade mark for a product of Oilless Industrial Company, which is made of a non-thermoplastic resin added with a solid lubricant, a lubricating oil and an inorganic fibrous reinforcing material), oil-containing polyacetal resins, thermosetting polyamide resins and thermosetting xylene resins.

Figure 4:
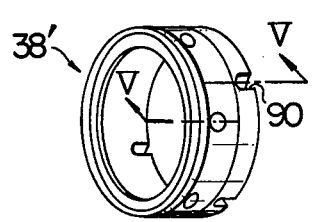
FIG. 4 is a perspective view of an annular insert according to another embodiment of the present invention.
Figure 5:
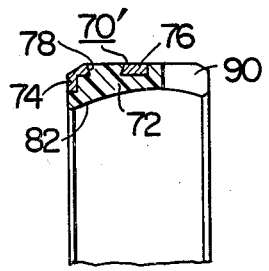
FIG. 5 is a sectional view taken along the line V—V in FIG. 4.

FIGS. 4 and 5 show another embodiment of the annular insert 38' according to the present invention. Parts of the annular insert 38' similar to those of the annular insert 38 shown in FIGS. 2 and 3 are designated by the same reference characters. The annular insert 38' differs from the annular insert 38 shown in FIGS. 2 and 3 in that the ring member 70' has an axial length of about one half that of the annular insert 38', and that a plurality of notches 90 are formed only in the self-lubricating shoe member 72 in place of the gap 80 formed in the annular insert 38 shown in FIGS. 2 and 3.

The annular inserts 38, 38' include a self-lubricating shoe member which is made of a material including a synthetic resinous material as main component, and is formed with a gap 80 or notches 90, thereby rendering the annular insert 38, 38' elastically deformable to facilitate fitting the ball 44 in the annular insert 38, 38'. Particularly, the annular insert 38 formed with the gap 38 contributes to improving the performance of the double Cardan universal joint owing to the fact that the elasticity of the ring member 70 formed of sheet steel serves to apply increased fixed load on the ball 44 when the ball 44 is fitted in the annular insert 38. The gap 80 or notches 90 also facilitates rapping during the forming of the annular insert.

The self-lubricating shoe member 72 made of a synthetic resinous material is applied with grease or other lubricant during assembling, but maintains a good bearing performance for the ball 44 even if lubricant is exhausted due to leakage in use. Thus any seizure can be avoided during a high speed operation.

As aforementioned, the ring member 70 is formed of sheet steel by press working, and then cooperates with the self-lubricating shoe member 72 to be formed into a unitary structure. The metallic ring member serves to prevent the annular insert from getting out of the socket opening 52, which would occur in case the annular insert formed only of a synthetic resinous material were subject to a reduction in force fit interference due to repeated changes in temperature.

While the preferred embodiments of the present invention have been shown and described hereinabove, it is to be understood that many changes and modifications in construction and actuation may be made therein without departing from the scope of the present invention.

What is claimed is:
1. In a double Cardan universal joint including:
   a pair of cross joint assemblies each including a yoke and a trunnion of a cross;
   a motion transmitting ring; and
   a centering assembly comprising
   a socket portion extending from one of said yokes and formed with a socket opening and a lubricant reservoir,
   a cylindrical stem extending from the other of the yokes into said socket opening,
   an annular insert mounted in said socket opening, a ball member oscillatorily retained in said annular insert and formed with an aperture for receiving said cylindrical stem for rotation about its own axis and axial sliding movement, a first seal means disposed between the outer peripheral surface of said ball member and said socket portion, and a second seal member disposed between said aperture in said ball member and said cylindrical stem;

the improvement comprising forming said annular insert from a self-lubricating shoe member formed of a synthetic resinous material and further including a metallic ring member integrally formed with at least a portion of said self-lubricating shoe member and having a flange portion extending about a predetermined portion of said self-lubricating shoe member, said annular insert being formed with yielding means for allowing said insert to be deformable radially outwardly so that it can be fitted about said ball member.

2. A double Cardan universal joint as claimed in claim 1 wherein said yielding means comprises a gap extending across said ring member and said self-lubricating shoe member.

3. A double Cardan universal joint as claimed in claim 1 wherein said yielding means comprises a plurality of notches extending a predetermined depth into said self-lubricating shoe member and spaced apart about the periphery thereof.

4. A double Cardan universal joint as claimed in claim 1 wherein said yielding means comprises a plurality of notches formed in said self-lubricating shoe member only.

5. A double Cardan universal joint as in claim 1 wherein said ring member is provided with a plurality of means defining openings spaced from one another about said ring member so that said self-lubricating shoe member extends therein.

6. A double Cardan universal joint as in claim 1 wherein a predetermined portion of said self-lubricating shoe member extends axially outwardly beyond said ring member.

7. A double Cardan universal joint as in claim 6 wherein said yielding means comprises a plurality of notches spaced apart about the portion of said self-lubricating shoe member extending outwardly beyond said ring member each of which extends a predetermined depth therein.

* * * * *